(12) United States Patent
Kellens et al.

(10) Patent No.: US 7,892,335 B2
(45) Date of Patent: Feb. 22, 2011

(54) PHASE TRANSFER APPARATUS AND PROCESS

(75) Inventors: Marc Kellens, Muizen (BE); Anthony Harper, South Cave (GB)

(73) Assignee: N.V. DeSmet Ballestra Engineering S.A. (BE)

( * ) Notice: Subject to any disclaimer, the term of this patent is extended or adjusted under 35 U.S.C. 154(b) by 288 days.

(21) Appl. No.: 11/864,400

(22) Filed: Sep. 28, 2007

(65) Prior Publication Data
US 2008/0081097 A1 Apr. 3, 2008

(30) Foreign Application Priority Data
Sep. 28, 2006 (EP) ................................. 06020388

(51) Int. Cl.
*B01D 53/14* (2006.01)
(52) U.S. Cl. .............................. 96/234; 96/290; 95/159; 95/191; 95/211; 95/237; 261/96; 261/97
(58) Field of Classification Search .................... 95/159, 95/191, 210–211, 237–240, 263–265; 96/202, 96/234, 290; 426/425; 210/767, 774; 261/96, 261/97
See application file for complete search history.

(56) References Cited

U.S. PATENT DOCUMENTS 1,988,648 A 1/1935 Engelke (Continued)

FOREIGN PATENT DOCUMENTS

BE 877839 1/1980

(Continued)

OTHER PUBLICATIONS

European Communication/Extended Search Report (EP Application No. 06020388.2) mailed Apr. 3, 2007.

(Continued)

*Primary Examiner*—Duane Smith
*Assistant Examiner*—Ives Wu
(74) *Attorney, Agent, or Firm*—Wegman, Hessler & Vanderburg

(57) ABSTRACT

The invention relates to an apparatus for the transfer of organic compounds from a first liquid phase to a gaseous phase and from said gaseous phase to a second liquid phase, comprising a packed stripping column (2), a housing (5), a shell (1), a means for introducing the gaseous phase at the bottom end of said packed stripping column (2), a distributor (4) for distributing said first liquid phase onto said packed stripping column (2), causing said first liquid phase to trickle down said packed stripping column (2) counter-currently to the flow of the gas phase and causing the gas stream leaving said packed stripping column (2) at its top end to have a higher content of organic compounds than the gaseous phase introduced at the bottom end of said packed stripping column (2), one or more ducts (9/26) allowing the gaseous phase leaving said packed stripping column (2) to flow downwards to the bottom end of a packed scrubber (3) enclosed in a housing (25), a distributor (12) on top of said packed scrubber (3) causing the second liquid phase to trickle down said packed scrubber (3) counter-currently to the flow of the gaseous phase and causing the gas stream leaving said packed scrubber from its top end to have a lower content of organic compounds than the gaseous phase entering the bottom end of said packed scrubber (3).

11 Claims, 2 Drawing Sheets

U.S. PATENT DOCUMENTS

| | | | |
|---|---|---|---|
| 2,461,694 A | | 2/1949 | McCubbin et al. |
| 2,470,652 A | * | 5/1949 | Scofield ............... 261/94 |
| 2,571,143 A | | 10/1951 | Leslie |
| 2,674,609 A | | 4/1954 | Beal et al. |
| 2,678,327 A | | 5/1954 | Clayton |
| 2,691,830 A | | 10/1954 | Karnofsky |
| 2,713,023 A | | 7/1955 | Irvine |
| 2,746,168 A | | 5/1956 | Rickabaugh |
| 2,804,427 A | | 8/1957 | Suriano |
| 2,826,601 A | | 3/1958 | Barsky |
| 2,983,612 A | | 5/1961 | Eichberg |
| 3,310,487 A | | 3/1967 | Johnson et al. |
| 3,367,044 A | | 2/1968 | Fitch |
| 3,389,974 A | | 6/1968 | Barattini et al. |
| 3,392,455 A | | 7/1968 | Klingsbaker, Jr. et al. |
| 3,634,201 A | * | 1/1972 | Kehse ............... 203/42 |
| 3,966,445 A | | 6/1976 | Adams et al. |
| 4,049,686 A | | 9/1977 | Ringers et al. |
| 4,089,880 A | | 5/1978 | Sullivan |
| 4,138,230 A | | 2/1979 | Thompson |
| 4,164,506 A | | 8/1979 | Kawahara et al. |
| 4,415,443 A | | 11/1983 | Murphy |
| 4,601,790 A | | 7/1986 | Stage |
| 4,664,784 A | | 5/1987 | Harandi |
| 4,778,489 A | | 10/1988 | Weber |
| 4,996,072 A | | 2/1991 | Marschner et al. |
| 5,041,245 A | | 8/1991 | Benado |
| 5,214,171 A | | 5/1993 | Dijkstra et al. |
| 5,279,746 A | * | 1/1994 | Ziol ............... 210/750 |
| 5,387,322 A | * | 2/1995 | Cialkowski et al. ......... 202/158 |
| 5,401,867 A | | 3/1995 | Sitzmann et al. |
| 5,486,318 A | | 1/1996 | McKeigue et al. |
| 5,885,694 A | * | 3/1999 | Schultes ............... 428/174 |
| 6,001,220 A | | 12/1999 | Hillström et al. |
| 6,013,817 A | | 1/2000 | Stern et al. |
| 6,086,055 A | * | 7/2000 | Armstrong et al. ............. 261/96 |
| 6,106,720 A | * | 8/2000 | Kanel et al. ............... 210/634 |
| 6,127,560 A | | 10/2000 | Stidham et al. |
| 6,172,247 B1 | | 1/2001 | Copeland et al. |
| 6,172,248 B1 | | 1/2001 | Copeland et al. |
| 6,426,423 B1 | | 7/2002 | Copeland et al. |
| 6,623,604 B1 | | 9/2003 | Elsasser et al. |
| 6,658,851 B2 | | 12/2003 | Jellema et al. |
| 6,953,499 B2 | | 10/2005 | Kellens et al. |
| 2002/0169033 A1 | | 11/2002 | Sery |
| 2003/0070317 A1 | | 4/2003 | Anderson et al. |
| 2005/0066823 A1 | | 3/2005 | Kellens et al. |
| 2006/0030012 A1 | | 2/2006 | Kellens et al. |
| 2006/0057263 A1 | | 3/2006 | Kellens et al. |
| 2008/0051599 A1 | | 2/2008 | Adami et al. |
| 2008/0054502 A1 | * | 3/2008 | Monkelbaan ............... 261/97 |

FOREIGN PATENT DOCUMENTS

| | | |
|---|---|---|
| BE | 1005617 A3 | 11/1993 |
| DE | 382912 | 10/1923 |
| DE | 552532 | 6/1932 |
| DE | 1285983 | 1/1969 |
| DE | 2524545 A1 | 12/1975 |
| DE | 265074 A1 | 2/1989 |
| DE | 19520675 A1 | 12/1996 |
| EP | 0195991 A2 | 10/1986 |
| EP | 0 520 097 A1 | 12/1992 |
| EP | 1157615 A2 | 11/2001 |
| EP | 1 505 145 A1 | 2/2005 |
| EP | 1505145 B1 | 6/2006 |
| EP | 1624047 B1 | 10/2006 |
| EP | 1637201 B1 | 8/2007 |
| EP | 1818088 A1 | 8/2007 |
| EP | 1894913 A1 | 3/2008 |
| EP | 1905815 A1 | 4/2008 |
| FR | 2103267 | 4/1972 |
| GB | 589534 | 6/1947 |
| GB | 777413 | 6/1957 |
| GB | 789777 | 1/1958 |
| GB | 816 522 A | 7/1959 |
| GB | 1229266 | 4/1971 |
| GB | 1400836 | 7/1975 |
| GB | 1424049 | 2/1976 |
| GB | 1429773 | 3/1976 |
| GB | 1561494 | 2/1980 |
| GB | 2100613 A | 1/1983 |
| GB | 2176713 A | 1/1987 |
| GB | 2451577 A | 2/2009 |
| JP | 7-284643 | 10/1995 |
| JP | 2002/210399 A | 7/2002 |
| WO | WO 86/04603 A1 | 8/1986 |
| WO | WO 99/53001 A1 | 10/1999 |
| WO | WO 02/062157 A2 | 8/2002 |
| WO | WO 2005/100519 A1 | 10/2005 |
| WO | WO 2007/082766 A1 | 7/2007 |

OTHER PUBLICATIONS

European Communication/Extended Search report (EP Application No. 07075840) mailed Feb. 8, 2008.
Office Action (U.S. Appl. No. 10/912,361), mailed Nov. 13, 2008.
U.S. Appl. No. 12/175,837, filed Jul. 18, 2008, Kellens et al.
U.S. Appl. No. 12/175,859, filed Jul. 18, 2008, Adami et al.
Andersen, *Refining of Oils and Fats*, 2nd Ed., Pergamon Press, United Kingdom, 1962, pp. 187-199.
Erickson, *Practical Handbook of Soybean Processing and Utilization*, AOCC Press, Champaign, IL, 1995, pp. 246-249.
Kuroda et al., "An Edible Oil Deodorizer with a Direct-Fired Heater," *J. Am. Oil Chem. Soc.* 66:1781-1783, 1989.
Minifie et al., *Chocolate, Cocoa, and Confectionery, Science and Technology*, 2nd Ed., AVI Publishing Company, Inc., Westport, CT, 1980, pp. 67-88.
O'Brien et al., *Introduction to Fats and Oils Technology*, 2nd Ed., AOCS Press, Champaign, IL, 2000, pp. 256-258.
Van Gerpen et al., *Biodiesel Production Technology*, U.S. Department of Commerce, Jul. 2004.
Weber et al., "Fat Crystallizers with Stirring Surfaces: Theory and Practice," *OCL Oléagineux* 5:381-384, 1998.
English Language Explanation of BE 877839.
English Language Explanation of BE 1005617 A3.
English Language Explanation of DE 552532.
English Language Explanation of DE 19520675 A1.
English Language Explanation of JP 7-284643.
English Language Explanation and Machine Translation of JP 2002/210399 A.
European Search Report for European Patent Application No. 04077550 completed Feb. 17, 2005.
European Search Report for European Patent Application No. 06017333 completed Feb. 23, 2007.
European Search Report for European Patent Application No. 07075709 completed Nov. 21, 2007.
Office Action (U.S. Appl. No. 10/912,361), mailed Mar. 19, 2008.
Office Action (U.S. Appl. No. 11/198,084), mailed Dec. 3, 2007.
Office Action (U.S. Appl. No. 11/198,084), mailed Jul. 9, 2008.
Office Action (U.S. Appl. No. 11/226,758), mailed Aug. 18, 2008.
Office Action (U.S. Appl. No. 11/841,255), mailed Sep. 19, 2008.

* cited by examiner

PHASE TRANSFER APPARATUS AND PROCESS

CROSS-REFERENCE TO RELATED APPLICATIONS

This application claims priority to EP Patent Application Serial No. 06020388.2, filed Sep. 28, 2006, the disclosure of which is hereby incorporated by reference.

FIELD OF THE INVENTION

The present invention relates to a counter-current phase transfer process of organic compounds between a liquid phase and a gaseous phase. The present invention also relates to an apparatus for performing said process, as may be used for instance in the vacuum stripping of organic compounds like edible oils and fats. In particular the present invention relates to an apparatus for the phase transfer of one or more organic compounds, said apparatus comprising a specific arrangement of one or more packed columns surrounded by one or more ducts.

BACKGROUND TO THE INVENTION

Phase transfer processes between a liquid phase and a gaseous phase and comprising a packed column are quite common in the processing of oilseeds and/or organic compounds like edible oils. In the latter circumstances, phase transfer processes are used to recover the extraction solvent in oilseed extraction plants and also during the refining of edible oils and fats. Edible oils and fats, also referred hereinafter as triglyceride oils, can be of animal origin such as lard or edible tallow, or of vegetable origin such as but not limited to soya bean oil, rapeseed oil, palm oil, and lauric oils like palm kernel oil or coconut oil.

Refining triglyceride oils usually comprises the following steps:
a degumming process to remove phosphorus-containing compounds present in the crude oil,
a neutralisation process to remove free fatty acids,
a bleaching process to remove coloured compounds, and
a deodorisation process to remove malodorous compounds from the bleached oil.

The number of processing steps involved in the refining of triglyceride oils can often be profitably reduced, for instance by combining the degumming process with the bleaching process in the so-called dry degumming process, and/or by combining the neutralisation process with the deodorisation process in the so-called physical or steam refining process.

The deodorisation process and the steam refining process are vacuum stripping processes. They comprise the steps of degassing the oil to avoid oxygen present in the feedstock from reacting with the triglyceride oil after the oil temperature has been raised, heating the oil to a temperature that can be as high as 270° C. under a vacuum of for example 2-20 mbar, contacting the heated oil with a stripping medium such as steam or nitrogen, and finally cooling the oil. To save energy, various means such as counter-current heat exchangers and thermo-siphons are commonly used.

The deodoriser used in the deodorisation process can be provided with a number of superimposed trays inside the deodoriser shell to ensure intimate contact between the stripping medium and the oil being deodorised or steam refined. The stripping medium may be injected to each tray of the deodoriser through multiple coils and/or gas lift pumps. Another way to establish the required contact between the stripping medium and the oil being deodorised or steam refined is by employing a packed column used in cross-flow mode as described in U.S. Pat. No. 2,991,298 or in counter-current flow as described in U.S. Pat. No. 3,506,696. In the latter, the oil is fed to the top of the packed column and the stripping medium is fed to said packed column from underneath.

The packing material in the packed columns used in the above instances can be Raschig rings as mentioned in U.S. Pat. No. 2,991,298, Pall rings as mentioned in U.S. Pat. No. 3,506,696, a metal cloth as described in German Laid-Open Application 196 05 286 A1, but it can also be a structured packing material as mentioned in U.S. Pat. No. 6,001,220 describing a deodorisation plant for fatty materials. Such structured packing material is for example also described in U.S. Pat. No. 6,713,158, and a method of distributing such a structured packing material inside a packed column in such a way that liquid migration in a transverse, horizontal direction of the column is virtually inhibited has been described in U.S. Pat. No. 5,486,318.

Because the deodoriser operates under vacuum, a pump is used to evacuate the content of the deodoriser and extract both the stripping medium and the organic compounds that entered the stripping gas stream during the phase transfer process between the liquid oil phase and the gaseous stripping medium. To reduce the load on the vacuum pump, said organic compounds are commonly condensed in a so-called scrubber. This condensing step performed in the scrubber can comprise spraying a cooled condensate into the vapour stream by means of one or more sprayers, collecting the condensate stream, cooling it, and recycling the cooled stream to the one or more sprayers. The apparatus used for the condensing step can also comprise a packed column, instead of sprayers, to ensure good contact between the vapour stream and the liquid condensate stream.

Accordingly, a deodoriser shell may contain a number of superimposed trays underneath a scrubber comprising a packed column. This scrubber has to be constructed in such a way that the gas stream that is laden with organic vapours encounters as little resistance as possible when moving through said packed column and that the liquid condensate flowing down said column is kept separate from the triglyceride oil being deodorised or physically refined. To this end, a flat collection sheet provided with slits can be mounted underneath the packed scrubber column, whereby the slits allow the gas stream to move upwards, whereby raised sides around the slits guide the liquid collected on the flat sheet to a condensate collection point, and whereby gutters above the slits prevent liquid from falling down the slits and guide any liquid falling down towards the flat collection sheet.

However, this system of condensate collection has a number of disadvantages. The collection sheet will be relatively cold because the condensate collected onto the sheet has been cooled before being distributed over the scrubber column. Consequently, part of the organic compounds present in the vapour stream being sucked towards the scrubber may well condense against the underside of the collection sheet and the resulting condensate may drop into and contaminate the oil from which it had been removed by vacuum stripping. The system is also difficult to construct and thus expensive to build and operate efficiently.

Therefore there is a need in the art for performing phase transfer processes of organic compounds between a liquid phase and a gaseous phase, e.g. in the vacuum stripping of organic compounds like edible oils and fats, without the complications and/or disadvantages of the prior art. There is also a need in the art for designing an apparatus for performing such phase transfer processes of organic compounds that, due to the concept of construction, can be made, maintained and operated at a minimal cost.

OBJECT OF THE INVENTION

It is an object of the invention to overcome the disadvantages of the phase transfer processes of the prior art by providing phase transfer processes, especially to the edible oil industry, using packed columns of improved efficiency, easier and cheaper to construct, as well as by providing the edible oil industry with simple means to increase the capacity of existing deodorisers.

Within the above object of the invention, it is an additional advantage of the invention to provide a distributor for a polygonal, usually tetragonal, column that ensures an equal distribution of the liquid to be subjected to phase transfer over the column packing.

Further advantages of the present invention will become apparent from the description hereinafter.

SUMMARY OF THE INVENTION

It has been surprisingly found that the above object is met, according to the present invention, in a phase transfer process of organic compounds between a gaseous phase and a liquid phase, being performed inside an apparatus comprising a specific arrangement of one or more packed columns surrounded by one or more ducts.

According to a first embodiment, the present invention provides an apparatus for the transfer of organic compounds from a liquid phase to a gaseous phase, comprising a packed stripping column (2) having a bottom end and a top end, a housing (5) enclosing said packed stripping column (2), a shell (1) surrounding said housing (5), means for introducing a gaseous phase from the bottom end of said packed stripping column (2), a distributor (4) for distributing said liquid phase onto said packed stripping column (2) causing said liquid phase to trickle down said packed stripping column (2) counter-currently to the flow of the gaseous phase and causing the gas stream leaving said packed stripping column (2) at its top end to have a higher content of organic compounds than the gaseous phase introduced at the bottom end of said packed stripping column (2), and one or more ducts (9) located between said housing (5) and said shell (1) and allowing the gaseous phase leaving said packed stripping column (2) to flow downwards.

According to a second embodiment, the present invention provides an apparatus for the transfer of organic compounds from a gaseous phase to a liquid phase, comprising a packed scrubber (3) having a bottom end and a top end, a housing (25) enclosing said packed scrubber (3), a shell (1) surrounding said housing (25), one or more ducts (26) located between said housing (25) and said shell (1) and allowing the gaseous phase to flow downwards to the bottom end of said packed scrubber (3), a distributor (12) on top of said packed scrubber (3) causing said liquid phase to trickle down said packed scrubber (3) counter-currently to the flow of the gaseous phase and causing the gas stream leaving said packed scrubber (3) from its top end to have a lower content of organic compounds than the gaseous phase entering the bottom end of said packed scrubber (3).

According to another embodiment, the present invention provides an apparatus for the transfer of organic compounds from a first liquid phase to a gaseous phase and from said gaseous phase to a second liquid phase, further comprising a packed scrubber (3) having a bottom end and a top end, a housing (25) enclosing said packed scrubber (3), said shell (1) surrounding said housing (25), one or more ducts (26) located between said housing (25) and said shell (1) and allowing the gaseous phase to flow downwards to the bottom end of said packed scrubber (3), a distributor (12) on top of said packed scrubber (3), causing said second liquid phase to trickle down said packed scrubber (3) counter-currently to the flow of the gaseous phase and causing the gas stream leaving said packed scrubber (3) from its top end to have a lower content of organic compounds than the gaseous phase entering the bottom end of said packed scrubber (3).

According to yet other aspects, the present invention provides processes for the transfer of organic compounds between a liquid phase and a gaseous phase as outlined in the detailed description below.

Significant additional advantages can be obtained, according to another embodiment of the invention, by providing one or more of the above-mentioned distributors with distributor trays and a header having as many equal diameter holes as the number of said distributor trays.

DETAILED DESCRIPTION OF THE INVENTION

Figures 1, 2:
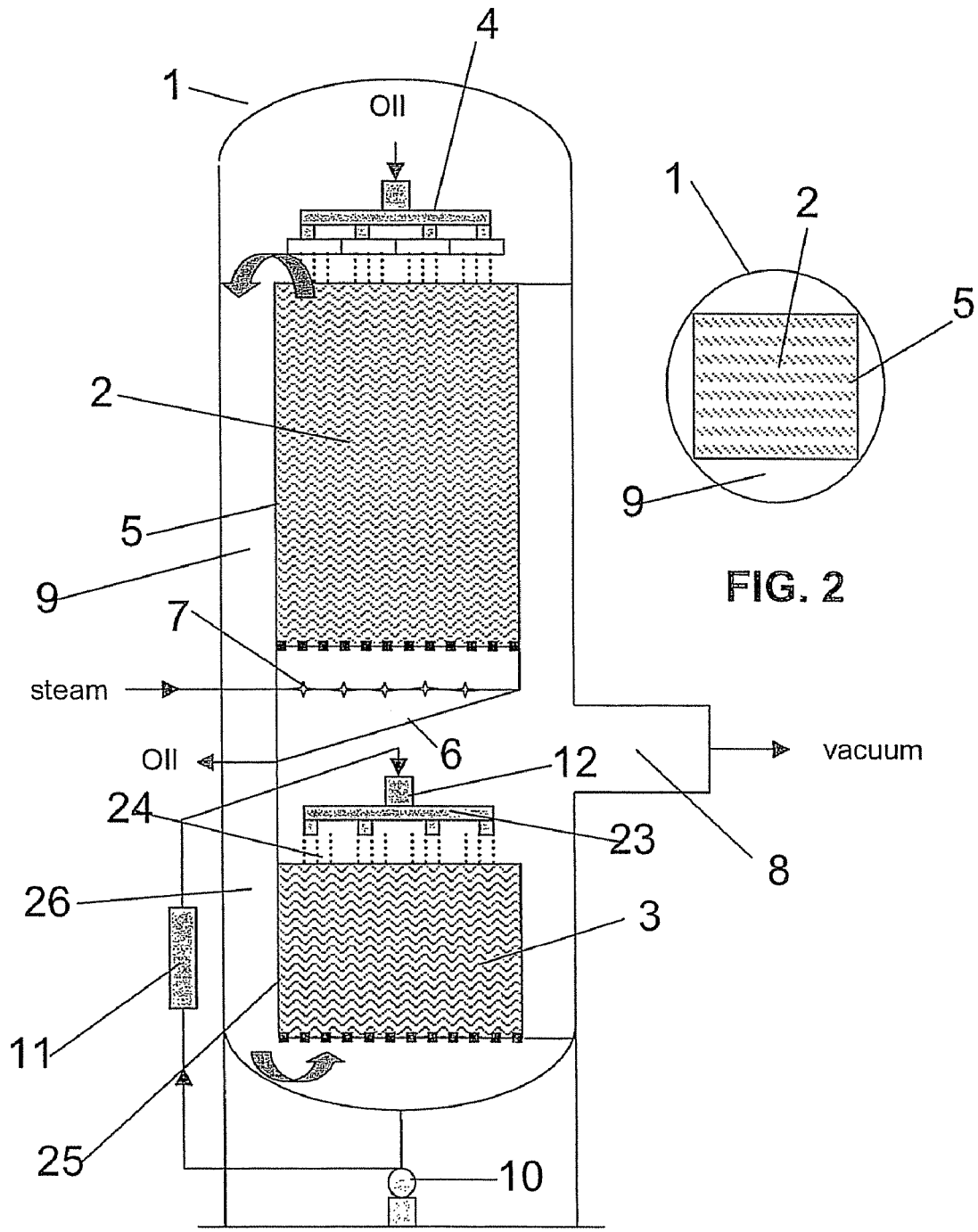
FIG. 1 is a schematic representation of a shell comprising a packed stripping column and a packed scrubber according to the present invention.
FIG. 2 is a horizontal cross-section through the shell according to the present invention represented in FIG. 1, and drawn in a smaller scale than FIG. 1.

It has been surprisingly found that the above object is met, according to the present invention, in a phase transfer process between a gaseous phase and a liquid phase, being performed inside an apparatus comprising a packed stripping column (2) and/or a packed scrubber (3), a housing (5) enclosing said packed stripping column (2) and/or a housing (25) enclosing said packed scrubber (3), a shell (1) surrounding or surrounded by said housing (5) and/or said housing (25), one or more ducts (9) between said housing (5) and said shell (1) and/or one or more ducts (26) between said housing (25) and said shell (1), and, located above said packed stripping column (2), a distributor (4) for distributing said liquid phase onto said packed stripping column (2) and/or a distributor (12) on top of the packed scrubber (3), causing said liquid phase to trickle down said packed stripping column (2) or said packed scrubber (3) counter-currently to the flow of the gas phase and causing the gas stream leaving said packed stripping column (2) and/or said packed scrubber (3) at its top end to have a different content of organic compounds from the content of organic compounds when entering said packed stripping column (2) and/or packed scrubber (3) from below, wherein the gas stream with the highest content of organic compounds flows downwards through said one or more ducts (9) and/or said one or more ducts (26). Within this concept, the packed stripping column (2) and/or packed scrubber (3) preferably have a polygonal, e.g. square, cross-section.

According to a first aspect the present invention provides an apparatus for the transfer of organic compounds (e.g. free fatty acids, and volatile malodorous compounds included in an edible oil or fat feedstock) from a liquid phase (e.g. edible oils or fats) to a gaseous phase (e.g. steam), comprising a packed stripping column (2) having a bottom end and a top end, a housing (5) enclosing said packed stripping column (2), a shell (1) surrounding said housing (5), means for introducing a gaseous phase from the bottom end of said packed stripping column (2), a distributor (4) for distributing said liquid phase onto said packed stripping column (2) causing said liquid phase to trickle down said packed stripping column (2) counter-currently to the flow of the gaseous and causing the gas stream leaving said packed stripping column (2) at its top end to have a higher content of organic compounds than the gaseous phase introduced at the bottom end of said packed stripping column (2), and one or more ducts (9) located between said housing (5) and said shell (1) and allowing the gaseous phase leaving said packed stripping column (2) to flow downwards.

According to a second aspect the present invention provides an apparatus for the transfer of organic compounds (e.g. free fatty acids, and volatile malodorous compounds included in an edible oil or fat feedstock) from a gaseous phase to a liquid phase (e.g. condensate), comprising a packed scrubber (3) having a bottom end and a top end, a housing (25) enclosing said packed scrubber (3), a shell (1) surrounding said housing (25), one or more ducts (26) located between said housing (25) and said shell (1) and allowing the gaseous phase to flow downwards to the bottom end of said packed scrubber (3), a distributor (12) on top of said packed scrubber (3) causing said liquid phase to trickle down said packed scrubber (3) counter-currently to the flow of the gaseous phase and causing the gas stream leaving said packed scrubber (3) from its top end to have a lower content of organic compounds than the gaseous phase entering the bottom end of said packed scrubber (3).

According to yet another aspect, the present invention provides an apparatus for the transfer of organic compounds from a first liquid phase to a gaseous phase and from said gaseous phase to a second liquid phase (e.g. an apparatus for the stripping of edible oils or fat and the scrubbing of the gaseous stream), further comprising a packed scrubber (3) having a bottom end and a top end, a housing (25) enclosing said packed scrubber (3), said shell (1) surrounding said housing (25), one or more ducts (26) located between said housing (25) and said shell (1) and allowing the gaseous phase to flow downwards to the bottom end of said packed scrubber (3), a distributor (12) on top of said packed scrubber (3), causing said second liquid phase to trickle down said packed scrubber (3) counter-currently to the flow of the gaseous phase and causing the gas stream leaving said packed scrubber (3) from its top end to have a lower content of organic compounds than the gaseous phase entering the bottom end of said packed scrubber (3).

According to a specific embodiment of the invention, the apparatus may further comprise means for providing vacuum. Such a means causes the gaseous phase to flow from its entry into the shell to its exit, such as for example an outlet (8), through the one or more packed columns present in the apparatus. According to such an embodiment, the vacuum provided is preferably comprised between about 2 to about 20 mbar absolute.

According to another aspect the one or more packed columns present in the apparatus may have a tetragonal cross-section, e.g. in the form of rectangle or a parallelogram, preferably a square cross-section.

According to yet another aspect, the present invention provides a process for the transfer of organic compounds (e.g. free fatty acids, or volatile malodorous compounds included in an edible oil or fat feedstock) between a liquid phase (e.g. edible oils or fat) and a gaseous phase (e.g. steam). According to a first embodiment of this aspect, the present invention provides a process for the transfer of organic compounds from a liquid phase to a gaseous phase (e.g. steam) comprising the steps of:

(a) providing a gaseous phase to the bottom end of a packed stripping column having a tetragonal cross-section,
(b) providing a liquid phase on top of said packed stripping column,
(c) flowing said gaseous phase upwards said packed stripping column,
(d) flowing said liquid phase downwards through said packed stripping column and counter-currently to the flow of said gaseous phase, and
(e) recovering at the top end of said packed stripping column a gaseous phase having a higher content of organic compounds than the gaseous phase provided in step (a), and
(f) recovering at the bottom end of said packed stripping column a liquid phase having a lower content of organic compounds than the liquid phase provided in step (b).

According to another embodiment of this aspect, the present invention provides a process for the transfer of organic compounds (e.g. free fatty acids, and volatile malodorous compounds included in an edible oil or fat feedstock) from a gaseous phase to a liquid phase (e.g. a condensate) comprising the steps of:

(a) providing a gaseous phase to the bottom end of a packed scrubber having a tetragonal cross-section,
(b) providing a liquid phase on the top of said packed scrubber,
(c) flowing said gaseous phase upwards through said packed scrubber,
(d) flowing said liquid phase downwards through said packed scrubber and counter-currently to the flow of said gaseous phase,
(e) recovering at the top end of said packed scrubber a gaseous phase having a lower content of organic compounds than the gaseous phase provided in step (a), and
(f) recovering at the bottom end of said packed scrubber a liquid phase having a higher content of organic compounds than the liquid phase provided in step (b).

According to another embodiment of this aspect, the present invention provides a process for the successive transfer of organic compounds (e.g. free fatty acids, and volatile malodorous compounds included in an edible oil or fat feedstock) from a first liquid phase (e.g. edible oils or fats) to a gaseous phase (e.g. steam) and then from said gaseous phase to a second liquid phase (e.g. a condensate), comprising the steps of:

(a) providing a gaseous phase at the bottom end of a packed stripping column having a tetragonal cross-section,
(b) providing a first liquid phase on top of said packed stripping column,
(c) flowing said gaseous phase upwards said packed stripping column,
(d) flowing said first liquid phase downwards through said packed stripping column and counter-currently to the flow of said gaseous phase, thus resulting in a gaseous phase having a higher content of organic compounds than the gaseous phase provided in step (a), and a liquid phase having a lower content of organic compounds than the first liquid phase provided in step (b),
(e) conveying the gaseous phase resulting from step (d) downwards to the bottom end of a packed scrubber, (f) providing a second liquid phase on the top of said packed scrubber, (g) flowing said gaseous conveyed in step (e) upwards through said packed scrubber, (h) flowing said second liquid phase provided in step (f) downwards through said packed scrubber and countercurrently to the flow of said gaseous phase, (i) recovering at the top end of said packed scrubber a gaseous phase having a lower content of organic compounds than said gaseous phase conveyed in step (e), and (j) recovering at the bottom end of said packed scrubber a liquid phase having a higher content of organic compounds than the second liquid phase provided in step (f).

In any of the above-described embodiments of the process of the invention, the tetragonal cross-section of the stripping column or the scrubber refers to the cross-section perpendicular to the flowing direction of the liquid phase.

According to a specific embodiment of this aspect, the process of this invention is preferably operated under a vacuum of 2-20 mbar absolute.

According to another specific embodiment, the process is operated in such a way that the temperature of the liquid phase provided on top of the scrubber is lower than the temperature of the gaseous phase entering the packed scrubber at its bottom end.

Referring now in greater detail to one non-limiting embodiment of the present invention as illustrated by FIG. 1, there is shown a vessel comprising a shell 1, a packed stripping column 2 and a packed scrubber 3. The type of embodiment shown by FIG. 1 can be advantageously used to increase the capacity of an existing deodoriser, e.g. for oils and fats. The packed stripping column 2 and/or the packed scrubber 3 comprises a structured packing well known in the art such as, but not limited to, a gauze packing or a wire mesh packing, with a low pressure drop and a high specific surface area, typically in the area of some 200-500 $m^2/m^3$.

According to the present invention, an edible oil or fat may be degassed and heated in an existing deodoriser (not shown in FIG. 1) before being fed to the shell 1, and is then distributed over a stripping column 2 by means of a distributor 4. The stripping column 2 is enclosed by a housing 5 which, in the non-limiting embodiment shown in FIG. 2, has a square cross-section. Given the circular cross section of the shell 1, a square cross-section of the housing 5 is preferred but rectangular, pentagonal, hexagonal or other polygonal cross-sections are also admissible, therefore also fall within the scope of the present invention.

Polygonal cross sections, in particular square cross-sections, of the housing 5 have a number of advantages over circular cross-sections in the performance of this invention. The packing segments fitting inside a polygonal, housing 5 for instance, have only to be cut to the right length and all have the same length if the housing 5 is rectangular or square. This avoids a significant waste of expensive packing material and further facilitates the installation of the packing segments when packing the stripping column 2 or the scrubber 3. In addition, an even distribution of the liquid over the stripping column 2 or the scrubber 3 is also facilitated by a polygonal, in particular square, cross-section allowing all trays 22 of the distributor 4 to have the same length so that each of them distributes the liquid at the same rate. This in turn causes the phase transfer according to the invention to be more efficient and thereby requiring a smaller stripping column or scrubber volume.

The edible oil or fat fed to the packed stripping column 2 trickles down onto a collection sheet 6 having a slight slope (e.g. from about 5 to about 15 degrees with respect to horizontal) so that the oil is collected at the lowest point from where it is fed to the deodorisation trays in the existing deodoriser (not shown in FIG. 1). As shown in FIG. 1, a steam distributor 7 feeds steam to the packed stripping column 2 from underneath in order to enable phase transfer between the gaseous stripping medium and the liquid oil. Accordingly, the gas stream leaving the packed stripping column 2 has a higher content of organic compounds than the gas stream fed to the packed stripping column 2 by the steam distributor 7.

Because of the vacuum applied at the outlet 8 of the shell 1, the gas stream leaving the packed stripping column 2 is sucked via a segmental duct 9 right to the bottom of the shell 1 and through a packed scrubber 3 towards the vacuum outlet 8 as indicated by the arrows in FIG. 1. The deodoriser condensate is distributed over the packed scrubber 3 by means of a distributor 12 and collects in the bottom part of the shell 1 where it is collected by a pump 10 and recycled to the distributor 12 via a cooler 11. Excess liquid condensate can be sent to intermediate storage by a purge valve (not shown in FIG. 1) that is actuated by a level control in the bottom of the shell 1.

Because of the phase transfer between the gaseous phase and the liquid phase in the packed scrubber 3, the organic compounds removed from the edible oil in the stripping column 2 will condense onto the cooled condensate in the packed scrubber 3. Consequently, the gas stream leaving the packed scrubber 3 has a lower content of organic compounds than the gas stream entering the packed scrubber 3. Accordingly, the gas stream with the highest content of organic compounds flows downward through one or more segmental ducts 26.

Figures 3, 4:
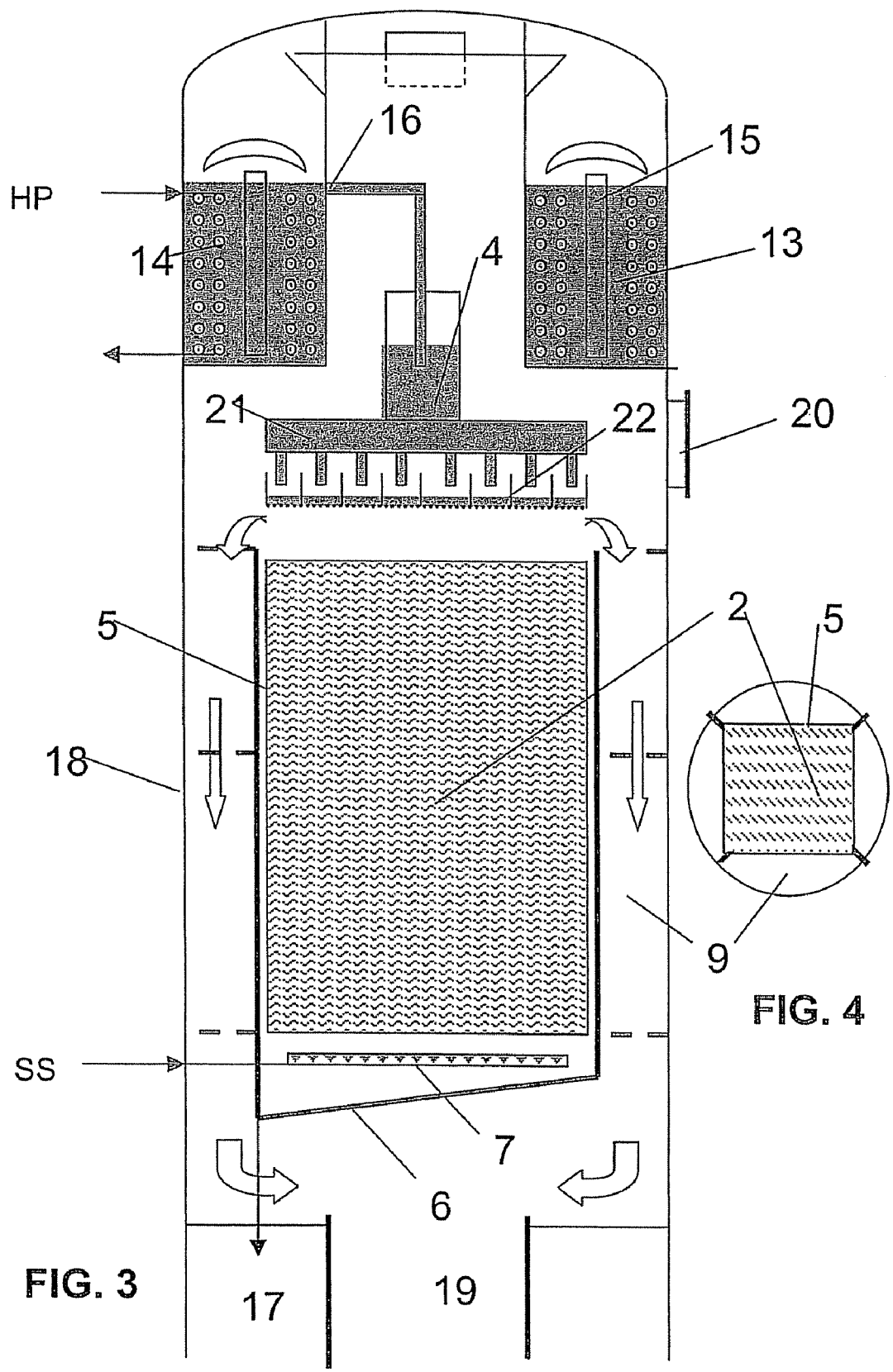
FIG. 3 shows the top part of a deodoriser according to the present invention comprising its final heating tray and a packed stripping column.
FIG. 4 is a horizontal cross-section through the deodoriser according to the present invention as shown in FIG. 3, drawn in a smaller scale than FIG. 3.

In FIG. 3, according to another non-limiting embodiment of the invention, the top part of a deodoriser according to U.S. Pat. No. 6,953,499 has been represented. Edible oil is fed to a top tray 13 and heated by high-pressure (HP) steam coils 14 while being agitated by gas lift pumps 15. An overflow 16 maintains a constant level in the top tray 13 and supplies a packed stripping column 2 with edible oil via a distributor 4. The stripping column 2 is enclosed by a housing 5 and fed with stripping steam (SS) through a distributor 7. Underneath said distributor 7, the edible oil flows towards the lowest point of a collection sheet 6 having a slight slope (e.g. from about 5 to about 15 degrees with respect to horizontal) and then to a tray 17 as indicated by the vertical arrow.

The stripping medium leaving the distributor 7 moves through the packed stripping column 2 to effect phase transfer and changes direction as indicated by the arrows when leaving said packed stripping column 2 to move downwards through one or more segmental ducts 9 towards a central chimney 19 surrounded by the tray 17 and by trays further down (not shown in FIG. 3). During the phase transfer process, the gas stream entering the packed stripping column 2 from below gets enriched in organic compounds present in the edible oil leaving the distributor 4. Consequently, the gas stream leaving the packed stripping column 2 has a higher content of organic compounds than the gas stream supplied by the distributor 7, and moves downwards through one or more segmental ducts 9 to the central chimney 19 according to the invention.

Consequently, the packed stripping column 2 is surrounded by gas that has the same temperature as the gas flowing upwards inside said column 2 that is thereby well insulated thermally so that is exhibits improved performance. The number of segmental ducts 9 surrounding or surrounded by the housing 5 equals the number of the sides of its polygonal cross-section. Although it is not strictly necessary to use all segmental ducts 9 for the downward flow of the gas stream, this operating embodiment is however preferred because of the resulting thermal insulation. As shown in FIG. 4, the corners of said polygon need not touch shell 1 so that the process according to the invention enables the cross-sectional surface area of the column to be chosen independently from the diameter of the deodoriser shell 1.

Another advantage of the apparatus and operating process according to the present invention is shown by the distributor 4. For maintenance and safety reasons, the deodoriser shell is provided with a manhole 20 permitting inspection and replacement of deodoriser parts, such as packing and/or distributor elements. As shown schematically in FIG. 3, the distributor 4 can be constructed to comprise a single, U-shaped header 21 that is fed by overflow 16 and the bottom of which is provided with as many holes as the distributor trays 22 positioned below. When these header holes have equal diameters, and provided that the bottom of header 21 has been mounted horizontally, the rates at which oil flows through these header holes will also be identical. Accordingly each distributor tray 22 will be fed at the same rate and thus distribute edible oil at the same rate.

The distributor trays 22 comprise U-shaped trays that are closed at both ends and with holes spread evenly over their horizontal bottom parts. They can be bolted to each other through their upright sides. The combination of header 21 and distributor trays 22 ensures that oil is distributed evenly over the entire column surface. Moreover, the system of the present invention may be regarded as self-regulating in that any change in the oil supply rate through overflow 16 will result in level changes in the header 21 and the distributor trays 22 which level changes will in turn cause the oil flow rate through the respective header holes to change in an identical manner so that an even distribution is maintained over time.

Similarly, the distributor 12 comprises a header 23, the bottom of which has been provided with as many holes as there are distributor trays 24 that can be bolted to each other through their upright sides. Again, this combination of header 23 and distributor trays 24 having equal length ensures the cooled deodoriser distillate to be distributed evenly over the entire scrubber packing surface.

All patents, patent applications, and publications mentioned in this specification are herein incorporated by reference.

Other embodiments are within the following claims.

What is claimed is:

1. An apparatus for the transfer of organic compounds from a first liquid phase to a gaseous phase and from said gaseous phase to a second liquid phase, comprising a packed stripping column (2) having a bottom end and a top end, a housing (5) enclosing said packed stripping column (2), a shell (1) surrounding said housing (5), a means for introducing a gaseous phase from the bottom end of said packed stripping column (2), a distributor (4) for distributing said liquid phase onto said packed stripping column (2) causing said liquid phase to trickle down said packed stripping column (2) counter-currently to the flow of the gaseous phase and causing the gas stream leaving said packed stripping column (2) at its top end to have a higher content of organic compounds than the gaseous phase introduced at the bottom end of said packed stripping column (2), and one or more ducts (9) located between said housing (5) and said shell (1) and allowing the gaseous phase leaving said packed stripping column (2) to flow downwards, said apparatus further comprising a packed scrubber (3) having a bottom end and a top end, said housing enclosing said packed scrubber (3), said shell (1) surrounding said housing, one or more ducts (26) located between said housing and said shell (1) and allowing the gaseous phase to flow downwards to the bottom end of said packed scrubber (3), a distributor (12) on top of said packed scrubber (3), causing said second liquid phase to trickle down said packed scrubber (3) counter-currently to the flow of the gaseous phase and causing the gas stream leaving said packed scrubber (3) from its top end to have a lower content of organic compounds than the gaseous phase entering the bottom end of said packed scrubber (3).

2. An apparatus according to claim 1, including a means for providing a vacuum of 2-20 mbar absolute within said apparatus.

3. An apparatus according to claim 1, wherein the cross-section of the housing (5) is tetragonal.

4. An apparatus according to claim 1, wherein the cross-section of the housing is tetragonal.

5. An apparatus according to claim 1, wherein said distributor (4) comprises a header (21) and distributor trays (22) underneath said header (21), and wherein said header (21) is provided with as many equal diameter holes as the number of distributor trays (22).

6. An apparatus according to claim 1, wherein said distributor (12) comprises a header (23) and distributor trays (24) underneath said header (23), and wherein said header (23) is provided with as many equal diameter holes as the number of distributor trays (24).

7. An apparatus according to claim 1, wherein said distributor (4) comprises a header (21) and distributor trays (22) underneath said header (21), wherein said header (21) is provided with as many equal diameter holes as the number of distributor trays (22), and wherein all said distributor trays (22) have the same length.

8. An apparatus according to claim 1, wherein said distributor (12) comprises a header (23) and distributor trays (24) underneath said header (23), wherein said header (23) is provided with as many equal diameter holes as the number of distributor trays (24), and wherein all said distributor trays (24) have the same length.

9. Counter-current phase transfer apparatus having a liquid phase and a gaseous phase in said apparatus, a packed column in said apparatus, means for feeding said liquid phase downwardly through said packed column, and means for moving said gas phase upwardly through said packed column, said packed column comprising a structured packing and having either a square cross section or a rectangular cross section.

10. Counter current phase transfer apparatus as recited in claim 9 wherein said structured packing has a square cross section.

11. Counter current phase transfer apparatus as recited in claim 9 wherein said structured packing has a rectangular cross section.

* * * * *